(12) United States Patent
Perkinson et al.

(10) Patent No.: US 8,545,178 B2
(45) Date of Patent: Oct. 1, 2013

(54) CONTROLLED PROPELLER PITCH LOCK ACTUATION SYSTEM

(75) Inventors: Robert H. Perkinson, Somers, CT (US); Peter J. Dowd, North Granby, CT (US); Paul A. Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1876 days.

(21) Appl. No.: 11/370,344

(22) Filed: Mar. 8, 2006

(65) Prior Publication Data

US 2007/0212220 A1 Sep. 13, 2007

(51) Int. Cl.
B64C 11/30 (2006.01)

(52) U.S. Cl.
USPC ................. 416/27; 416/46; 416/153

(58) Field of Classification Search
USPC ............. 416/27, 30, 46, 47, 153, 154, 159, 416/164, 165; 74/89.26, 89.37, 89.39, 89.36; 403/57; 464/106, 125, 126
See application file for complete search history.

(56) References Cited

U.S. PATENT DOCUMENTS

| | | | | |
|---|---|---|---|---|
| 2,806,383 | A | * | 9/1957 | Geyer .......................... 74/89.36 |
| 2,958,382 | A | * | 11/1960 | Covert et al. ................. 416/154 |
| 4,023,432 | A | * | 5/1977 | Killian ........................ 74/89.36 |
| 4,523,891 | A | | 6/1985 | Schwartz et al. |
| 4,753,572 | A | * | 6/1988 | Kusiak ............................ 416/46 |
| 5,141,399 | A | | 8/1992 | Duchesneau et al. |
| 5,186,608 | A | | 2/1993 | Bagge et al. |
| 5,836,743 | A | * | 11/1998 | Carvalho et al. ............. 416/139 |
| 6,401,557 | B1 | * | 6/2002 | Davies ......................... 74/89.39 |
| 6,685,382 | B2 | * | 2/2004 | Capewell et al. ............. 403/343 |
| 7,353,723 | B2 | * | 4/2008 | Lardy et al. .................. 74/89.23 |
| 2003/0029258 | A1 | * | 2/2003 | Davies et al. ................ 74/89.26 |

OTHER PUBLICATIONS

Extended European Search Report for Application No. 07250959.9 dated Jan. 12, 2010.

* cited by examiner

*Primary Examiner* — Nathaniel Wiehe
(74) *Attorney, Agent, or Firm* — Carlson, Gaskey & Olds PC

(57) ABSTRACT

A variable pitch propulsor system with a propeller pitchlock system having a pitchlock solenoid valve located in communication with a pitchlock pressure circuit to selectively actuate pitchlocking in response to a controller. The pitchlock solenoid valve includes an electro-mechanical device which is normally closed but may be commanded to electrically open and dump the pitchlock pressure which causes actuation of the pitchlock system. The pitchlock solenoid provides a mechanism which will selectively pitchlock the propulsor system; permits a built in test routine to determine the condition of the pitchlock system through a commanded propeller pitchlock sequence; requires no mechanical link between the rotating and non-rotating propeller components to initiate pitchlock; is independent of engine and gearbox configurations; and can initiate pitchlock remotely with a signal from a remote location.

17 Claims, 11 Drawing Sheets

CONTROLLED PROPELLER PITCH LOCK ACTUATION SYSTEM

BACKGROUND OF THE INVENTION

The present invention relates to propulsor systems, and more particularly to a pitchlocking system that may be selectively commanded to pitchlock without a mechanical link between the rotating and non-rotating propeller components.

In typical variable pitch propulsor systems, a plurality of propulsor blades, each pivotably mounted for movement about its longitudinal axis relative to a rotary hub driven by an aircraft engine, are operatively connected to a mechanical or hydromechanical blade pitch change system disposed within the hub assembly. These blade pitch change actuation systems typically include a pitchlock for maintaining blade pitch in the event of a malfunction such as a loss in the system's hydraulic supply.

Conventional pitch lock systems often incorporate a pitch lock screw to provide a locking mechanism which prevents the blades from moving to a lower blade angle in addition to a separate ballscrew mechanism which is backdriven to rotationally drive the pitchlock screw.

Disadvantageously, as the pitchlock condition occurs through a mechanical link between the rotating and non-rotating propeller components bearings and a drive are required to transmit the control signal to the pitchlock screw, increasing complexity and reducing reliability.

Accordingly, it is desirable to provide a variable pitch propulsor system with an uncomplicated and light weight pitchlocking system that may be selectively commanded to pitchlock through a propeller control.

SUMMARY OF THE INVENTION

A variable pitch propulsor system according to the present invention provides a pitchlocking system in which the propeller blade loads, (ie. twisting moments), are transmitted about a blade centerline, through blade pins and reacted by a yoke assembly as an axial load. The yoke assembly includes an actuator piston that is hydraulically capable of outputting a force which overcomes the blade loads and position the blades to some desired operating angle. The pitchlocking system locks the propeller actuator at an axial location which corresponds to a current blade pitch angle should the actuator piston no longer hold or react the loads from the blades. The pitchlock system locks the actuator and prevents a decrease in blade angle when there is a hydraulic condition where the coarse pitch pressure cannot support the blade loads. The propeller is then pitchlocked and operates at that fixed pitch condition.

A pitchlock solenoid valve is located in communication with a pitchlock pressure circuit to selectively actuate pitchlocking in response to a controller. The pitchlock solenoid valve includes an electro-mechanical device which is normally closed but may be commanded to electrically open to dump the pitchlock pressure which causes actuation of the pitchlock system. The pitchlock solenoid provides a mechanism which will selectively pitchlock the propulsor system; permits a built in test routine to determine the condition of the pitchlock system through a commanded propeller pitchlock sequence; requires no mechanical link between the rotating and non-rotating propeller components to initiate pitchlock; is independent of engine and gearbox configurations, i.e., in-line and offset gearboxes; and can initiate pitchlock remotely with a signal from an electronic control or the flight deck if so desired The present invention therefore provides a variable pitch propulsor system with an uncomplicated and light weight pitchlocking system that may be selectively commanded to pitchlock through a propeller control.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
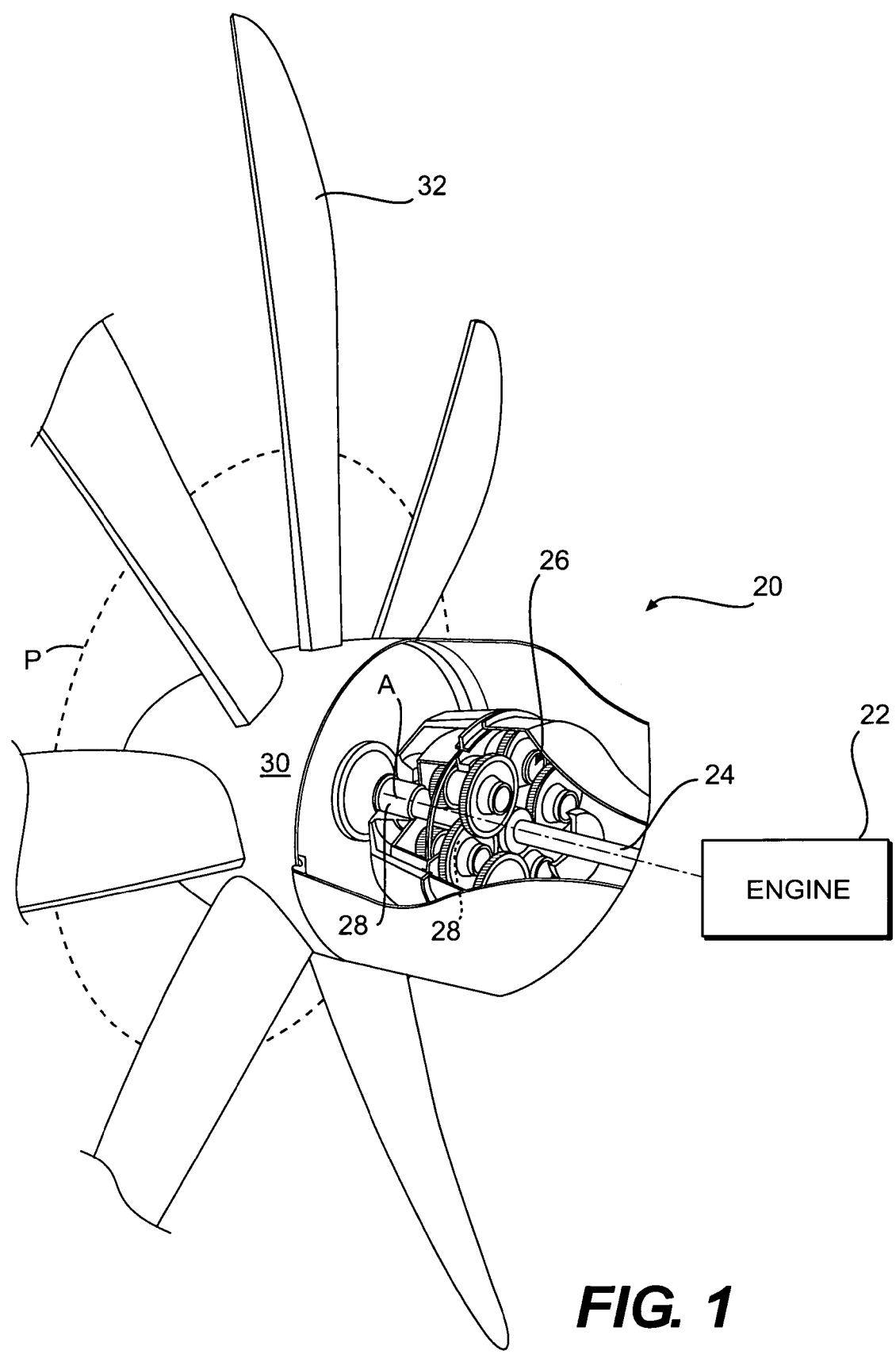
FIG. 1 is a general perspective view an exemplary gas turbine turboprop engine embodiment for use with the present invention.

FIG. 1 illustrates a general perspective view of a propeller system 20 driven by a gas turbine engine (illustrated schematically at 22). The engine 22 rotates a turbine output shaft 24 at a high speed to drives a gear reduction gearbox (illustrated somewhat schematically at 26) which decrease shaft rotation speed and increase output torque. The gearbox 26 drives a propeller shaft 28 which rotates a hub assembly 30 and a plurality of propeller blades 32 which extend therefrom. The hub axis A is substantially perpendicular to a plane P which is defined by the propeller blades 32.

Figure 2A:
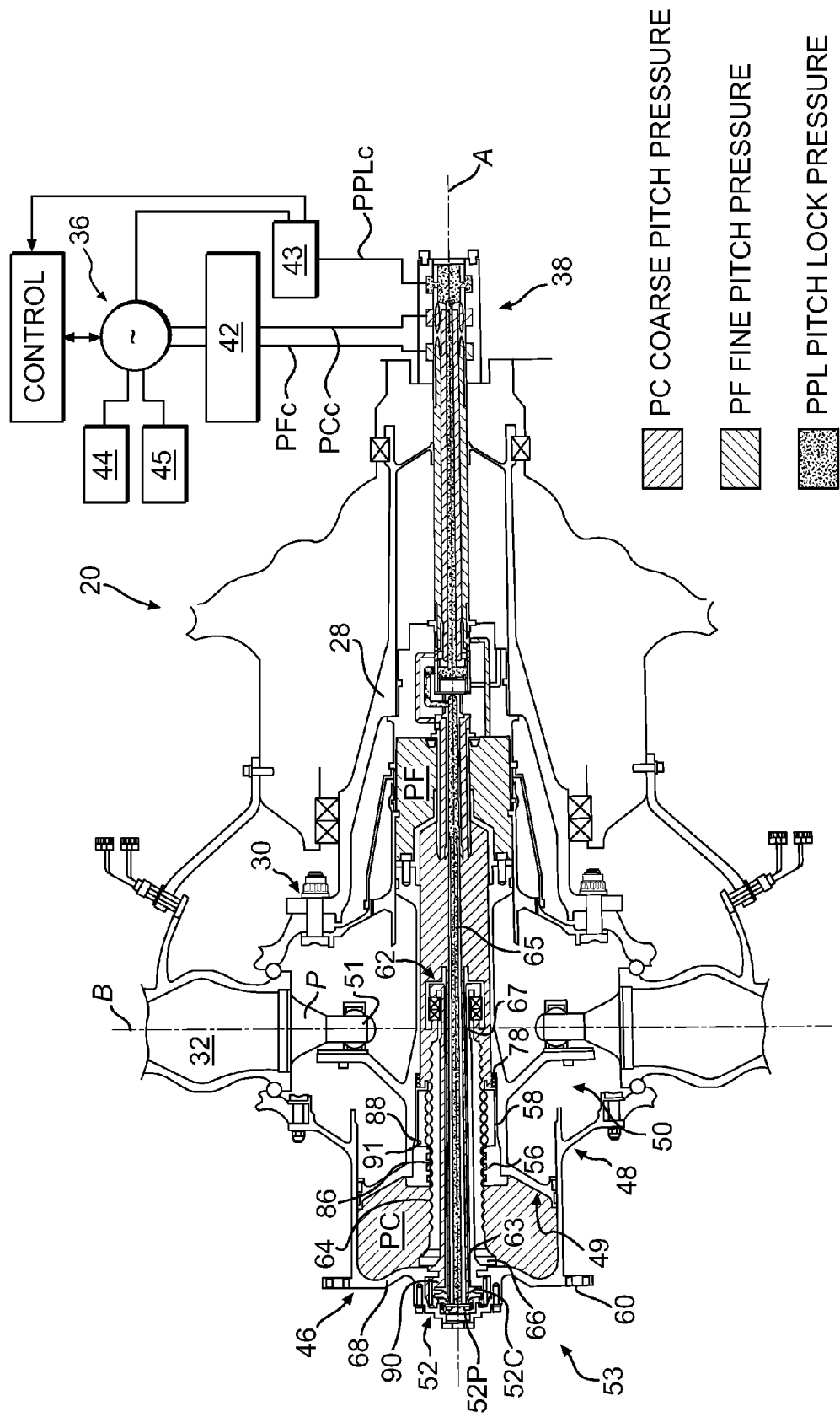
FIG. 2A is a sectional view of a turboprop system illustrating the electronic/hydraulic control system along a hub axis of rotation.

Referring to FIG. 2A, a sectional view of the propeller system 20 is illustrated. A main pump 36, for actuating the various mechanism disclosed herein, provides hydraulic pressure. The main pump 36 provides a pressure indicated generally by the appropriately shaded areas and more specifically by the $P_{subscript}$ designations, wherein PC is coarse pitch pressure, $P_F$ is fine pitch pressure, and $P_{PL}$ is pitchlock pressure.

The main pump 36 provides fluid pressure to the transfer bearing 38 through a servo valve 42. A feathering solenoid and protection valve 44 and a high pressure relief valve 45 are also preferably located between the main pump 36 and the transfer bearing 38. The pitchlock solenoid 43 is located in communication with the pitchlock pressure $P_{PL}$ line.

From the transfer bearing 38, pitchlock pressure $P_{PL}$ is communicated to a pitchlock system 46, while the coarse pitch pressure $P_c$ and the fine pitch pressure $P_F$ are supplied to a pitch change system 48 having a pitch change actuator 53. The pitch change actuator 53 is preferably mounted along the hub axis A forward of a yoke assembly 50. Generally, by selectively communicating coarse pitch pressure $P_c$ and fine pitch pressure $P_F$ to the pitch change system 48, speed governing, synchrophasing, beta control, feathering and unfeathering of the propeller blades 32 is hydraulically provided.

Preferably, a pitch change yoke is located between a coarse pitch actuator chamber PC and a fine pitch actuator chamber PF defined within the pitch change actuator 53. The chambers PC, PF are respectively supplied with coarse pitch pressure $P_c$ and fine pitch pressure $P_F$ from a coarse pitch pressure communication circuit $PC_c$ and fine pitch pressure communication circuit $PF_C$ (illustrated somewhat schematically) such that the pitch change actuator piston 49 is selectively driven by differential pressure therebetween. It should be understood that the hydraulic pressure system disclose herein is illustrated somewhat schematically as various pressure communication circuits may be utilized with the present invention.

The pitch change actuator piston 49 translates along axis A to drive a yoke assembly 50. The yoke assembly 50 is attached to a blade pin 51 which extends from each propeller blade 32 to control the pitch thereof. The yoke assembly 50 is mounted to the blade pin 51 about a pivot axis P which is offset from a blade axis B about which each propeller blades pitches.

The pitchlock system 46 interacts with the pitch change system 48 in response to differential pressure between pitchlock pressure $P_{PL}$ and coarse pitch pressure $P_c$. The pitchlock system 46 generally includes a pitchlock piston 52, a pitchlock ballscrew screw 54, a pitchlock nut 56, ballscrew ballnut 58 located generally along the hub axis A from forward to aft relative to dome assembly 60 which forms a portion of the hub assembly 30.

A ballscrew bearing support assembly 62 is mounted to a pitchlock piston load tube 63 about a pitchlock transfer tube 65 which communicates the pitchlock pressure $P_{PL}$ to the pitchlock piston 52. The pitchlock piston 52 is located to separate a pitchlock piston coarse pitch pressure chamber 52C from a pitchlock piston pitchlock pressure chamber 52P. The pitchlock piston coarse pitch pressure chamber 52C is supplied with coarse pitch pressure PC from the coarse pitch pressure communication circuit $PC_c$ and the pitchlock piston pitchlock pressure chamber 52P is supplied with pitchlock pressure $P_{PL}$ from the pitchlock pressure communication circuit $PPL_c$. The pitchlock pressure $P_{PL}$ is equivalent to the supply pressure $P_s$ to generally balance the pitchlock piston 52 therebetween. It should be understood that the pitchlock pressure $P_{PL}$ will be greater than the coarse pitch pressure $P_c$ by a predetermined amount such that the pitchlock piston 52 is actuated in response to a predetermined difference therebetween.

The pitchlock ballscrew screw 54 is back driven within the ballscrew ballnut 58 under normal operating conditions. The pitchiock ballscrew screw 54 rotationally translates relative to the ballscrew ballnut 58. The pitchlock ballscrew screw 54 includes a continuous ballscrew ball track groove 64 with a helix angle that matches the helix angle of the pitchlock nut 56, and the ballscrew ballnut 58. The pitchlock ballscrew screw 54 is mounted within the pitchlock nut 56 and the ballscrew ballnut 58 to rotationally axially advance or retreat over the full travel of the actuator yoke assembly 50.

A ballscrew screw flange 66 is located at a forward end segment of the pitchlock ballscrew screw 54. The ballscrew screw flange 66 is spaced away from an axially fixed actuator dome cover 68 during normal operation by a pitchlock gap.

Should a hydraulic pressure failure occur, the pitchlock gap is closed when the ballscrew screw flange 66 contacts the actuator dome cover 68 to lock the propeller blades 32 in their last pitch position. The ballscrew screw flange 66 is capable of reacting the full actuator fine pitch hydraulic pressure output and resulting blade load under failure conditions.

Opposite the ballscrew screw flange 66, an aft end segment 67 of the pitchlock ballscrew screw 54 is mounted within the ballscrew bearing support assembly 62. The ballscrew bearing support assembly 62 is mounted to the pitchlock piston load tube 63. The ballscrew bearing support assembly 62 moves axially with the pitchlock piston load tube 63 and provides a ground relative to which the pitchlock ballscrew screw 54 rotates. That is, the pitchlock ballscrew screw 54 rotates within the ballscrew bearing support assembly 62 and the ballscrew bearing support assembly 62 is axially translatable with the pitchlock piston load tube 63 in response to actuation of the pitchlock piston 52 that supports the pitchlock piston load tube 63.

The ballscrew ballnut 58 mates with the pitchlock ballscrew screw 54. The ballscrew ballnut 58 includes a continuous mating ballnut ball track groove 72 with a helix angle equivalent to that of the ballscrew ball track groove 64. The ballnut ball track groove 72 provides the other half of the ball track for the supporting ball bearings 74. The ballscrew ballnut 58 provides both the stationary contact surface for the ball bearings 74 as well as ball bearing containment and ball bearing crossovers.

The ballscrew ballnut 58, during normal operation, is mounted within an actuator yoke bore 76 and axially translates with the yoke assembly 50 until the ballscrew screw flange 66 contacts the axially fixed actuator dome cover 68 in response to some pitchlock input signal. At this point, when the actuator yoke 50 loads exceed a biasing force provided by a ballscrew ballnut spring 78, the ballscrew ballnut 58 will axially slide within the actuator yoke bore 76 until pitchlock nut threads 86 of the pitchlock nut 56 contact the ballscrew ball track groove 64 to pitchlock the pitchlock ballscrew screw 54 and react the aerodynamic blade loads.

The pitchlock nut 56 defines an external mounting thread 80 which corresponds to an internal thread 82 of the actuator yoke bore 76. The pitchlock nut 56 preferably includes a shoulder flange 84 which positions the pitchlock nut 56 relative the actuator yoke assembly 50. It should be understood that other attachments such as bolts or the like may alternatively be utilized.

Figure 3:
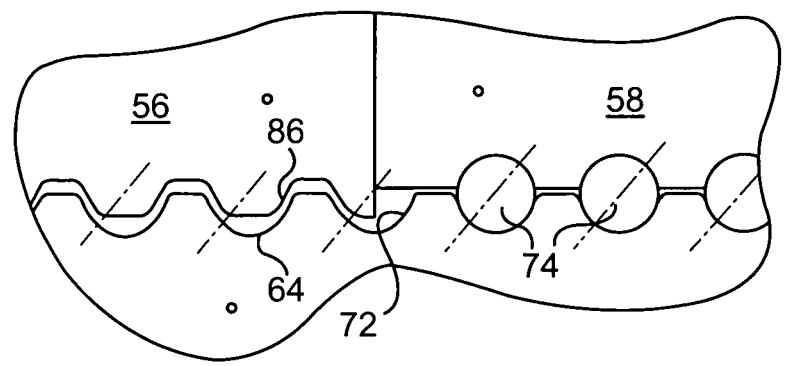
FIG. 3 is an expanded view of a ballscrew, ballscrew ballnut, and pitchlock nut in a pitchlock condition.

The pitchlock nut 56 includes internal pitchlock nut threads 86 that preferably provides a toroidal profile (FIG. 3) with the same helix angle as the ballscrew ball track groove 64 such that the pitchlock nut threads 86 mate therewith. The toroidal profile of the pitchlock nut threads 86 provide a clearance relative to the ballscrew ball track groove 64 (FIG. 3) such that under normal propeller operation the ballscrew ball track groove 64 and the pitchlock nut threads 86 do not contact. When the propeller is commanded to pitchlock and the resulting blade loads are transferred through the pitchlock nut 56 into the pitchlock ballscrew screw 54, the lead angle is configured such that the pitchlock ballscrew screw 54 cannot back drive in the pitchlock nut 56 and the propeller pitchlocks.

The ball bearings 74 provide the dynamic interface between the ballscrew ballnut 58 and the pitchlock ballscrew screw 54. The ball bearings 74 travel in the mating ball grooves of the ballscrew ball track groove 64 and the ballnut ball track groove 72 when the ballscrew ballnut 58 and pitchlock ballscrew screw 54 move relative to each other. The circuit of ball bearings 72 may be diverted within ball track cross-overs located in the ballscrew ballnut 58. The cross-overs provide recirculation and unrestricted travel of the ballscrew ballnut 58 relative to the pitchlock ballscrew screw 54. Because the ball bearings 74 roll in the ballscrew ball track groove 64 and the ballnut ball track groove 72, the friction losses are minimized allowing the pitchlock ballscrew screw 54 to be backdriven within the ballscrew ballnut 58.

A timing keyway 88 is located in both the pitchlock nut 56 and the ballscrew ballnut 58 within which a lock 91 fits. Because the ballscrew ballnut 58 and pitchlock nut 56 fit about the common pitchlock ballscrew screw 54, the threads must be properly timed. The timing keyway 88 times the ballnut ball track groove 72 and the pitchlock nut threads 86. The timing keyway 88 also provides an anti-rotation feature for the ballscrew ballnut 58. That is, to impart the resulting rotational load on the pitchlock ballscrew screw 54, the ballscrew ballnut 58 itself must be rotationally held to ground.

The ballscrew ballnut spring 78 provides an axial preload on the ballscrew ballnut 58 relative to the pitchlock nut 56 to ensure that under normal operating conditions, the pitchlock ballscrew screw 54 operates through the ball bearings 74. When the propeller is commanded to pitchlock and the resulting blade loads acting through the actuator yoke assembly 50 against the pitchlock ballscrew screw 54 exceed the ballscrew ballnut spring 78, the ballscrew ballnut spring 78 begins to collapse which permits the ballscrew ballnut 58 to translate (FIGS. 4A-4D) axially along the hub axis A and transfer the loads to the pitchlock nut threads 86.

The pitchlock nut threads 86 are designed to accept high axial loads through the tangential ball track groove flanks with a radial ball bearing seat for normal ballscrew screw 54 operation. The thread profile of the pitchlock nut threads 86 preferably resemble that of an ACME thread which provides a large bearing surface and a non-back driving interface. The thread profile of the pitchlock nut threads 86 are configured such that ball bearings 74 only contact on the radial ball bearing seat of the continuous ballscrew ball track groove 64, while the ACME style pitchlock nut threads 86 only contact on the flanks of the continuous ballscrew ball track groove 64 such that minimal deleterious effect to the track groove and normal ball bearing movement results.

Figure 4A:
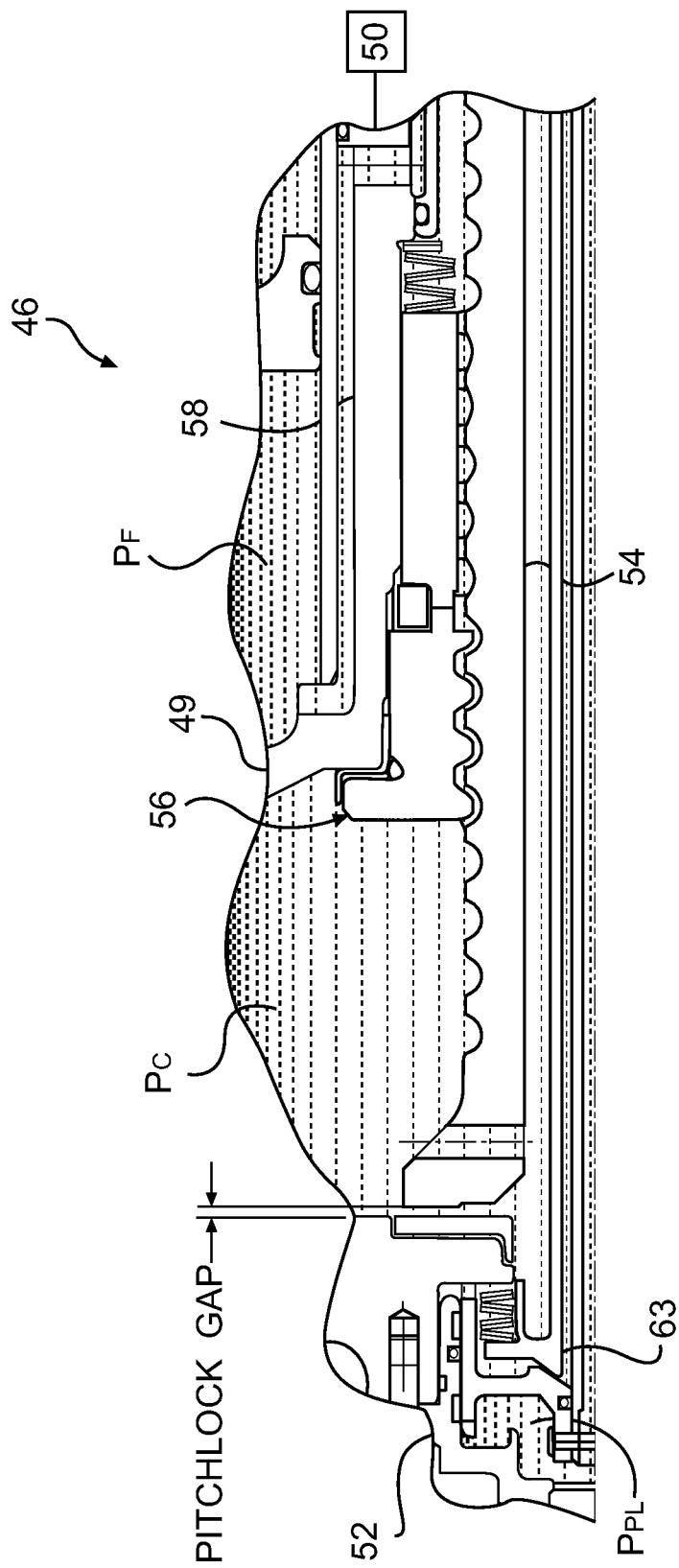
FIG. 4A is an expanded sectional view of the pitchlock system in a normal operating position.

Referring to FIG. 4A, the pitchlock system 46 is illustrated in a normal operational position in which the pitchlock gap is maintained and differential pressure between the coarse pitch pressure $P_c$ and the fine pitch pressure $P_F$ operate to effectuate movement of the pitch change actuator piston 49 and resulting pitch change to the propeller blades 32 (FIG. 2A).

The pitchlock pressure $P_{PL}$ is communicated to the pitchlock system 46 to counteract the coarse pitch pressure $P_c$, balance the pitchlock piston 52 and maintain the pitchlock gap. The pitchlock ballscrew screw 54 is mounted within the pitchlock nut 56 and the ballscrew ballnut 58 to rotationally advance or retreat over the full travel of the actuator yoke assembly 50 in response to movement of the pitch change actuator piston 49 through the differential pressure between the coarse pitch pressure $P_c$ and the fine pitch pressure $P_F$.

Figure 4B:
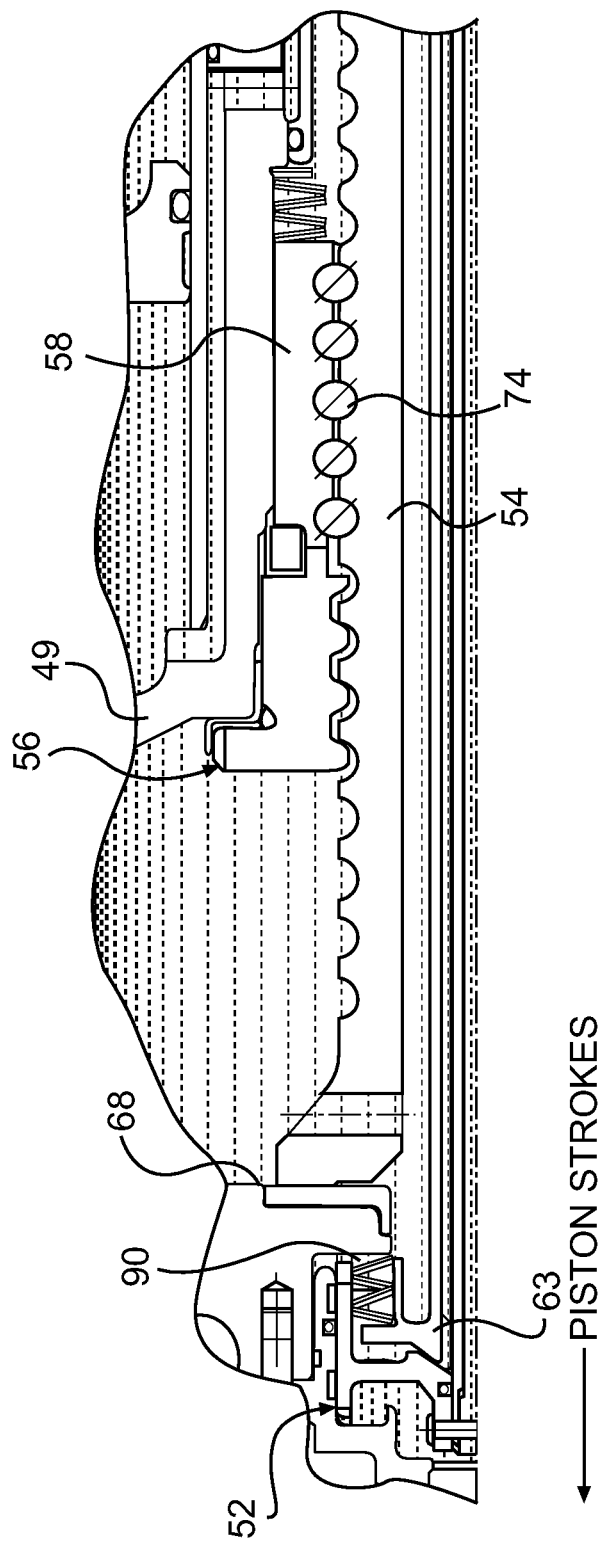
FIG. 4B is an expanded sectional view of the pitchlock system in a first initiated position.

Referring to FIG. 4B, when the propeller system is commanded to pitchlock such as by a decrease in the coarse pitch pressure $P_c$ which may result from a loss of hydraulic pressure, or by dumping of the pitchlock pressure $P_{PL}$, the pitchlock system 46 is mechanically initiated by the pitch lock spring.

Figure 2B:
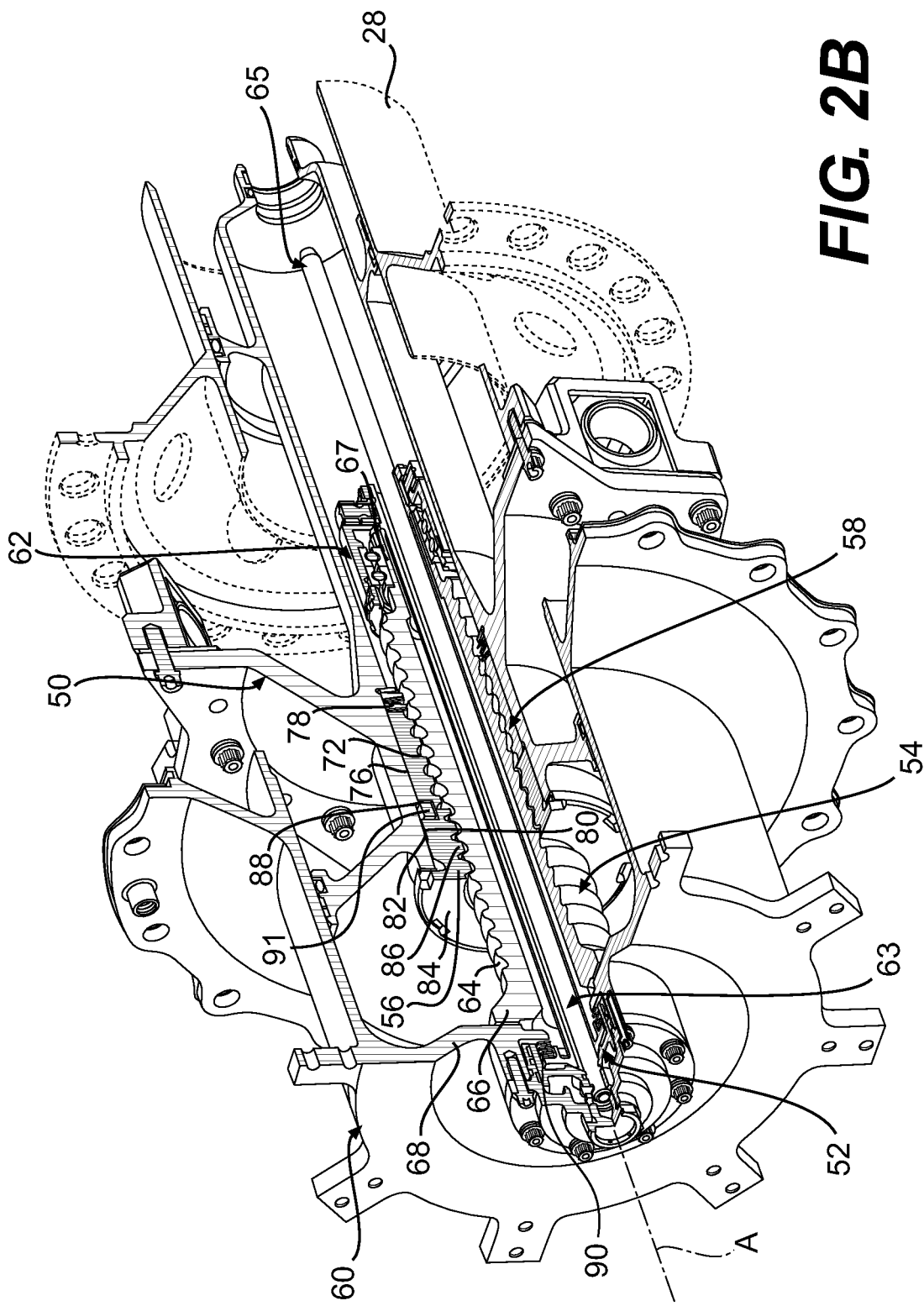
FIG. 2B is an expanded partial sectional view of a pitch change system valve illustrated in FIG. 2A.
Figure 4C:
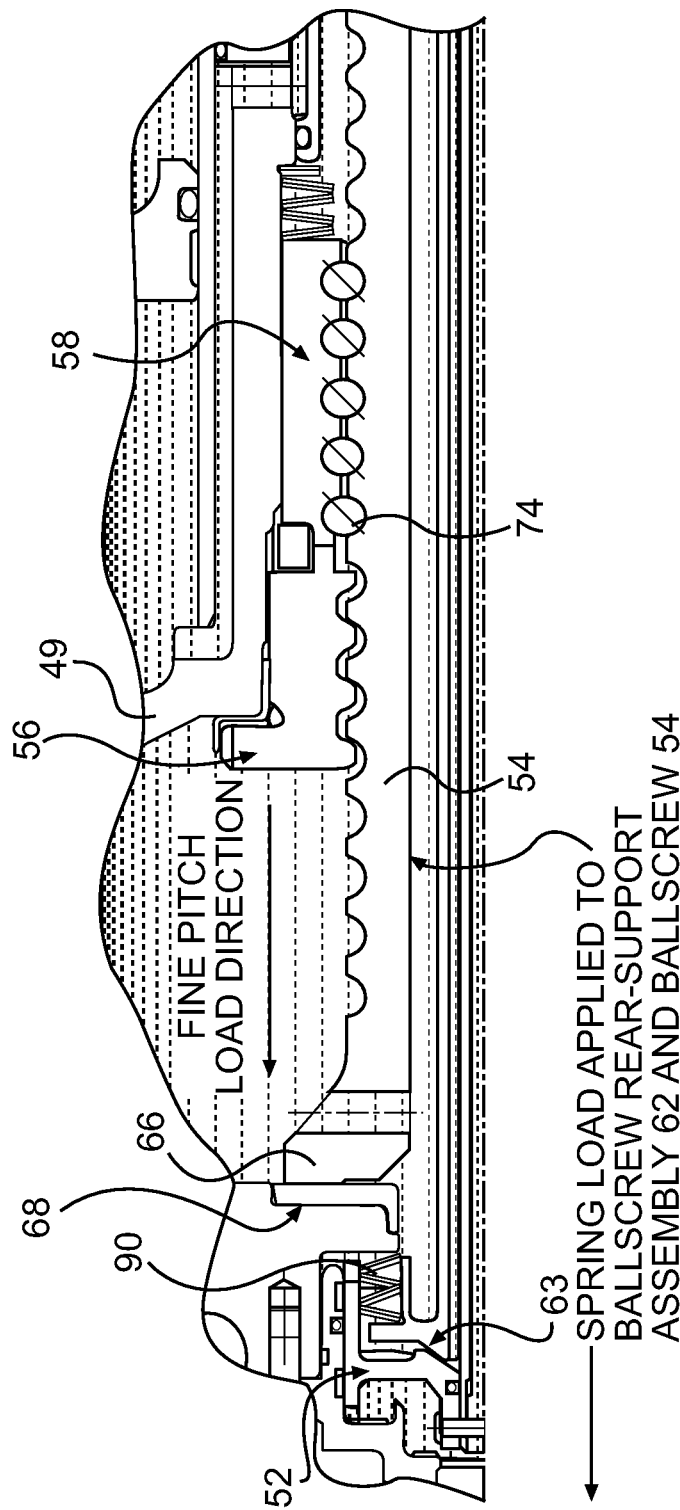
FIG. 4C is an expanded sectional view of the pitchlock system in a second initial pitchlock load reaction position.

Once the hydraulic pressure on the pitchlock piston 52 is removed, the pitchlock piston 52 and pitchlock piston load tube 63 are biased (to the left in the figure) by a set of piston springs 90. As the pitchlock piston load tube 63 strokes, the ballscrew bearing support assembly 62 (FIGS. 2A and 2B) which is mounted thereto also strokes to drive the pitchlock ballscrew screw 54 toward the axially fixed actuator dome cover 68 and close the pitchlock gap. The load from the piston springs 90 loads the pitchlock ballscrew screw 54 against the axially fixed actuator dome cover 68. Contact with the axially fixed actuator dome cover 68 generates a torsional and an axial resistance which grounds the pitchlock ballscrew screw 54. Referring to FIG. 4C, aerodynamic forces provide propeller blade loads which drives the pitch change system 48 and attached pitch change actuator piston 49 towards the fine pitch direction. The load driven through the ballscrew ballnut 58 and into pitchlock ballscrew screw 54 changes the contact angle (ie. direction) through the ball bearings 74. The load from pitchlock springs 90 holds the pitchlock ballscrew screw 54 against the axially fixed actuator dome cover 68 while the bias from the pitch change actuator piston 49 being driven towards fine pitch results in a force which attempts to back-drive the pitchlock ballscrew screw 54. However, the resistant torsional friction loads between the ballscrew screw flange 66 and the fixed actuator dome cover 68 are greater than the torque which is attempting to back-drive through the pitchlock ballscrew screw 54 such that the ballscrew ballnut spring 78 will begin to collapse (FIG. 4D).

Figure 4D:
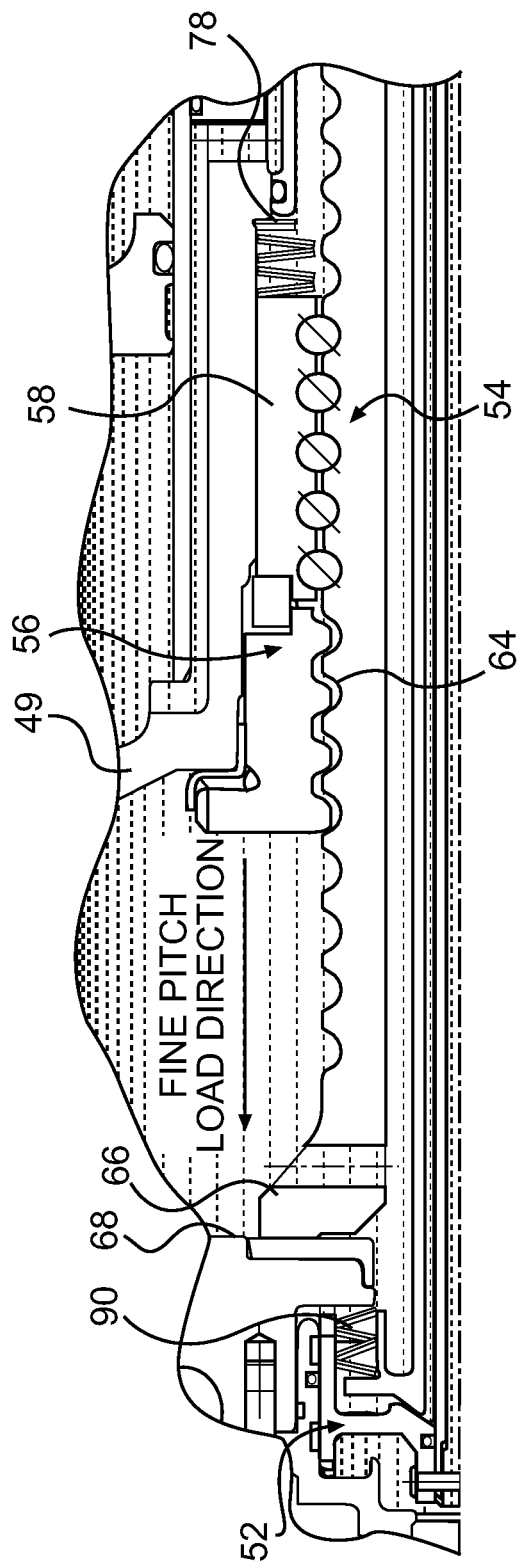
FIG. 4D is an expanded sectional view of the pitchlock system in a peak pitchlock load reaction position.

Referring to FIG. 4D, the ballscrew ballnut spring 78 begins to collapse due to decreased pitch load. The load from piston springs 90 maintains the pitchlock ballscrew screw 54 against the axially fixed actuator dome cover 68 while the bias from the pitch change actuator piston 49 being driven towards fine pitch attempts to back-drive the pitchlock ballscrew screw 54 and drive the ballscrew ballnut 58 therewith (note separation between the pitchlock nut 56 and the ballscrew ballnut 58). The pitch load continues to decrease enough to further collapse the ballscrew ballnut spring 78 such that the ACME style pitchlock nut threads 86 contact the flanks of the continuous ballscrew ball track groove 64 until the lead angle results in a lock-up condition to thereby pitchlock the propeller system. Notably, no mechanical link is required between the rotating and non-rotating propeller components to initiate pitchlock.

When the pitchlock pressure $P_{PL}$ is restored, the coarse pitch pressure $P_c$ is balanced and the bias from the piston springs 90 is overcome such that the pitchlock piston 52, the pitchlock piston load tube 63, attached ballscrew bearing support assembly 62 and pitchlock ballscrew screw 54 returns to their normal operational position (FIG. 4A). Commensurate therewith, the ballscrew ballnut spring 78 repositions the ballscrew ballnut 58 as the load on the ballscrew is removed such that the pitchlock gap returns (FIG. 4A) and normal operation again is available.

Preferably, a pitchlock solenoid valve 44 (FIG. 2A) is located in communication with the pitchlock pressure $P_{PL}$ circuit to selectively actuate pitchlocking in response to a controller (illustrated schematically at C). The pitchlock solenoid valve 44 is preferably an electro-mechanical device which is normally closed. When the pitchlock solenoid valve 44 is commanded to electrically open in response to the controller C, the valve 44 ports the pitchlock pressure $P_{PL}$ to return pressure (low) which causes the pitchlock piston 52 to stroke and initiate pitchlock as described above with reference to FIGS. 4A-4C.

Figure 5:
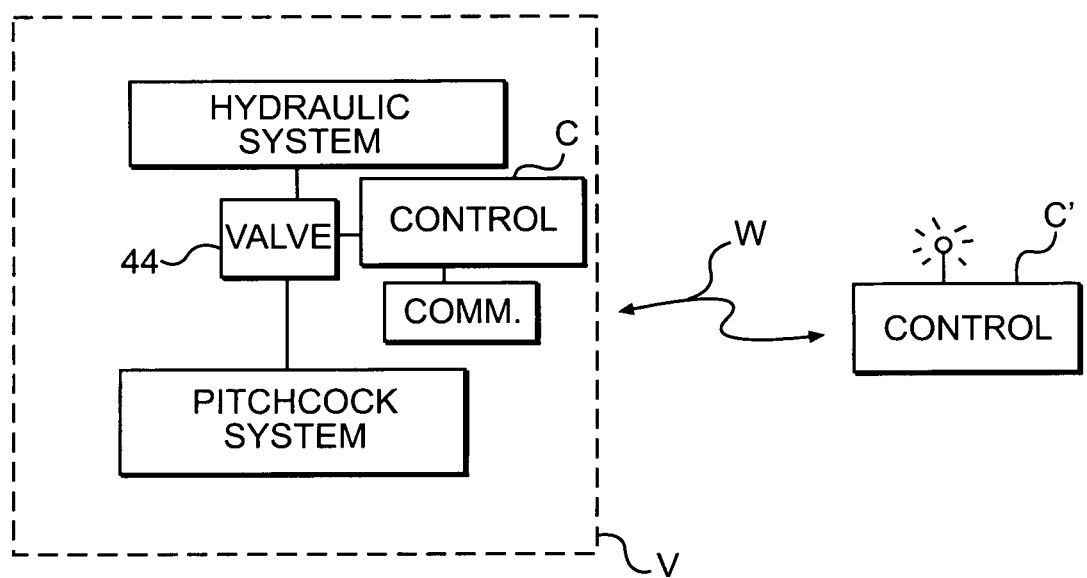
FIG. 5 is a schematic view of a pitchlock communication system.

Referring to FIG. 5, the pitchlock solenoid valve 44 is additionally or alternatively operated by a remotely located controller C' such that pitchlock may be commanded from a location separate from a vehicle V within which the pitchlock system is located. Such an arrangement advantageously provides for remotely commanded pitchlock from a flight deck or the like.

Figure 6A:
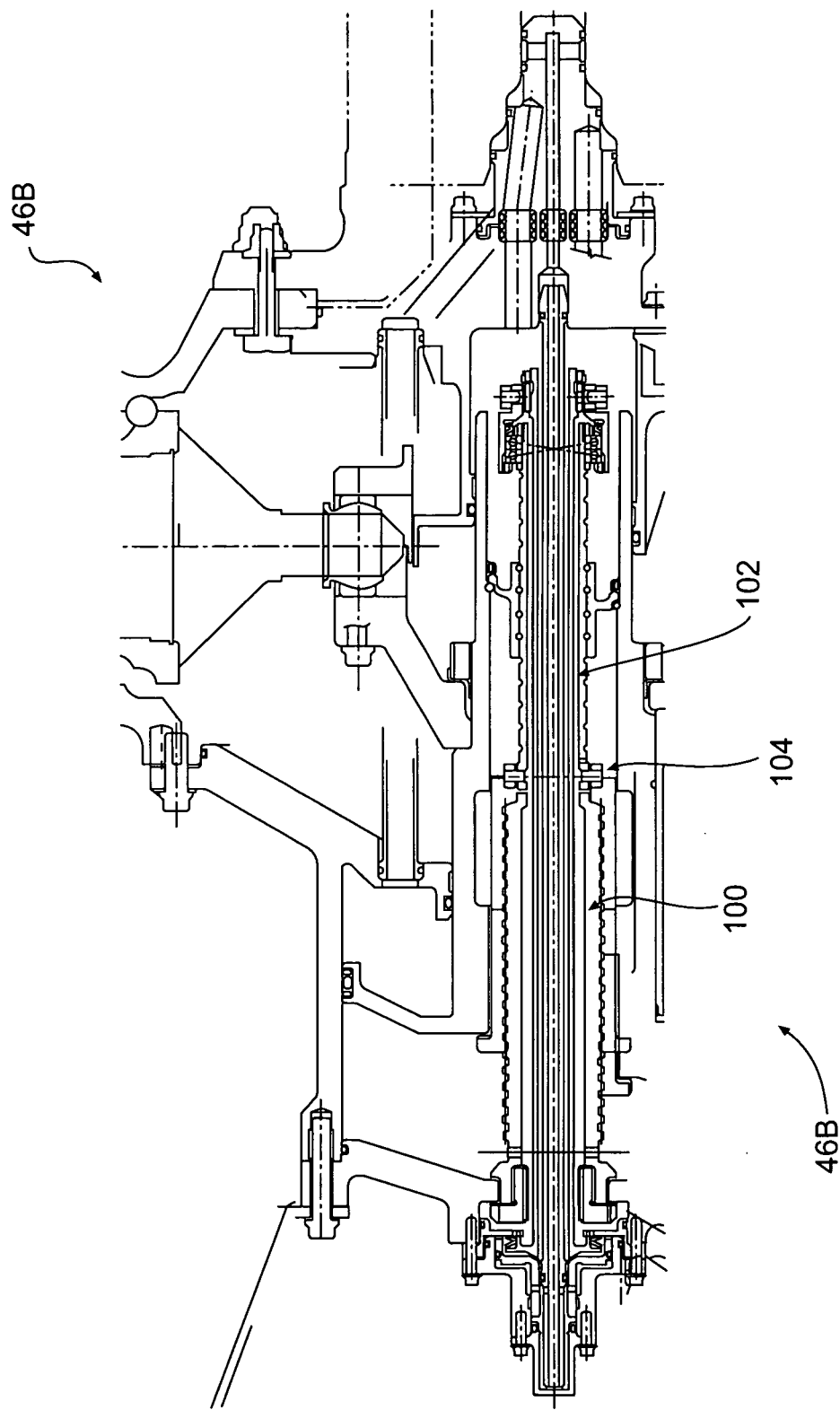
FIG. 6A is a sectional view of a turboprop system illustrating another electronic/hydraulic control system along a hub axis of rotation.

Referring to FIG. 6A, a sectional view of another the pitchlock system 46B which interacts with the pitch change system 48 in response to differential pressure between pitchlock pressure $P_{PL}$ and coarse pitch pressure $P_c$ is illustrated. The pitchlock system 46B is generally as described above such that only components which are different than that described above are discussed in detail. The pitchlock ballscrew screw 54B of the pitchlock system 46B generally includes a pitchlock screw 100 and a ballscrew screw 102 interconnected through a universal joint 104 arranged in a generally linear manner. That is, the pitchlock ballscrew screw 54B is articulately through separate components which are mounted together through the universal joint 104. The pitchlock screw 100 and the ballscrew screw 102 are located along the hub axis A in a sequential manner such that the pitchlock system 46B may have a longer axial length than the pitchlock system 46 but the pitchlock system 46B allows torque to be transmitted from the ballscrew to pitchlock screw with out generating side loads.

Figure 6B:
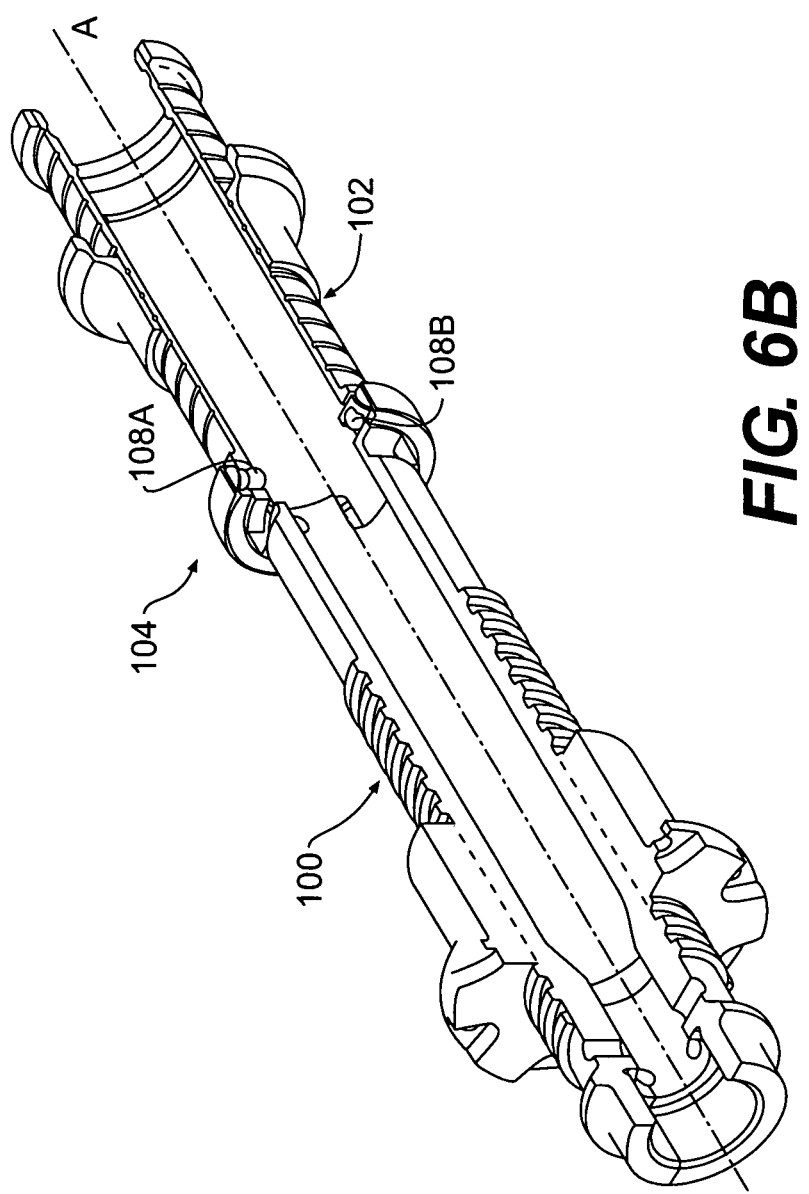
FIG. 6B is an expanded partial sectional view of a pitch change system illustrated in FIG. 6A.

Referring to FIG. 6B, the ballscrew screw 102 is pinned to a universal joint ring 106 of the universal joint 104 in two places 180° apart at universal pins 108A (one shown). A sliding clearance fit is provided between the universal pins 108A and apertures 110 in the ballscrew screw 102 that receive the pins 108. Likewise, the pitchlock screw 100 is pinned to the universal joint ring 106 in two places at universal pins 108B (one shown) to provide a similar sliding fit 90° in relation to the ballscrew pins 108A. This arrangement allows torque to be transmitted from the ballscrew 100 to the pitchlock screw 102 with out generating side loads. Without this type of connection side loads may be generated which may increase friction in the system. It should be understood that various pitchlock systems will benefit from the present invention.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:
1. A propulsor system comprising:
a coarse pitch pressure circuit which supplies a coarse pitch pressure;
a fine pitch pressure circuit which supplies a fine pitch pressure;
a pitchlock pressure circuit which supplies a pitchlock pressure;
a yoke assembly mounted along an axis of rotation, said yoke assembly including a pitch change actuator piston which separates a coarse pitch actuator chamber and a fine pitch actuator chamber, said coarse pitch actuator chamber pressurized by the coarse pitch pressure and said fine pitch actuator chamber pressurized by the fine pitch pressure;
a pitchlock piston which separates a pitchlock piston pitchlock pressure chamber and a pitchlock piston coarse pitch pressure, said pitchlock piston pressure chamber pressurized by the pitchlock pressure and said pitchlock piston coarse pitch chamber pressurized by the course pitch pressure circuit;
a pitchlock ballscrew screw mounted along an axis of rotation, said pitchlock ballscrew screw having an external screw ball track groove, said pitchlock ballscrew screw axially movable along said axis of rotation in response to axial movement of said pitchlock piston;
a pitchlock nut mounted about said ballscrew screw, said pitchlock nut having an internal pitchlock nut thread;
a ballscrew ballnut mounted about said pitchlock ballscrew screw and axially adjacent said pitchlock nut, said ballscrew ballnut includes an internal ballnut track groove;
a ballscrew ballnut spring which biases said ballscrew ballnut toward said pitchlock nut, said ballscrew ballnut spring collapsible such that said pitchlock ballscrew screw is movable between an operational position and a pitchlock position, said internal pitchlock nut thread lockable with said external screw ball track groove in said pitchlock position; and
a pitchlock solenoid valve in communication with the pitchlock pressure circuit, said pitchlock solenoid valve selectively operable to dump the pitchlock pressure such that said pitchlock ballscrew screw moves toward said pitchlock position.

2. The propulsor system as recited in claim 1, wherein said internal ballnut track groove and said external screw ball track groove have a common helix angle.

3. The propulsor system as recited in claim 2, further comprising a multiple of ball bearings mounted within said internal ballnut track groove and said external screw ball track groove.

4. The propulsor system as recited in claim 1, further comprises a pitchlock controller in communication with said pitchlock solenoid valve to selectively actuate said pitchlock solenoid valve.

5. The propulsor. system as recited in claim 1, wherein said pitchlock controller communicates with said pitchlock solenoid valve from a remote location.

6. The propulsor system as recited in claim 1, further comprising a pitchlock load tube mounted adjacent said pitchlock piston for movement therewith, said pitchlock ballscrew screw mounted for rotation about said pitchlock load tube through a pitchlock ballscrew screw support assembly.

7. The propulsor system as recited in claim 6, further comprising a pitchlock transfer tube mounted within said pitchlock load tube to communicate the pitchlock pressure to said pitchlock piston pressure chamber.

8. The propulsor system as recited in claim 6, further comprising a pitchlock piston biasing member which biases said pitchlock load tube toward said pitchlock piston.

9. The propulsor system as recited in claim 8, wherein the pitchlock pressure counterbalances the coarse pitch pressure and a bias of the pitchlock piston biasing member.

10. The propulsor system as recited in claim 1, wherein said pitchlock piston is mounted within an axially fixed actuator dome cover, said axially fixed actuator dome cover adjacent said ballscrew screw.

11. The propulsor system as recited in claim 10, wherein said pitchlock ballscrew screw contacts said axially fixed actuator dome cover when in said pitchlock position.

12. A pitchlock system comprising:
a coarse pitch pressure circuit which supplies a coarse pitch pressure;
a fine pitch pressure circuit which supplies a fine pitch pressure;
a pitchlock pressure circuit which supplies a pitchlock pressure;
a yoke assembly mounted along an axis of rotation, said yoke assembly including a pitch change actuator piston movably mounted within an actuator housing to separate a coarse pitch actuator chamber and a fine pitch actuator chamber, said coarse pitch actuator chamber pressurized by the coarse pitch pressure and said fine pitch actuator chamber pressurized by the fine pitch pressure;
a pitchlock ballscrew screw mounted along an axis of rotation, said pitchlock ballscrew screw having an external screw ball track groove, said pitchlock ballscrew screw axially movable along said axis of rotation in response to axial movement of said pitchlock piston, said pitchlock ballscrew screw movable between an operational position and a pitchlock position;
a pitchlock piston which separates a pitchlock piston pitchlock pressure chamber and a pitchlock piston coarse pitch pressure, said pitchlock piston pressure chamber pressurized by the pitchlock pressure and said pitchlock piston coarse pitch chamber pressurized by the course pitch pressure circuit, said pitchlock piston mounted adjacent an axially fixed actuator dome cover, said axially fixed actuator dome cover adjacent said pitchlock ballscrew screw;
a pitchlock load tube mounted adjacent said pitchlock piston for movement therewith, said pitchlock ballscrew screw mounted for rotation about said pitchlock load tube through a pitchlock ballscrew screw support assembly;
a pitchlock piston biasing member which biases said pitchlock load tube toward said pitchlock piston, said pitchlock ballscrew screw axially movable into contact with said axially fixed actuator dome cover in response to the pitchlock pressure within said pitchlock piston pressure chamber falling below the coarse pitch pressure within said pitchlock piston coarse pitch chamber; and
a universal joint which interconnects a pitchlock screw and a ballscrew screw of said pitchlock ballscrew screw.

13. The pitchlock system as recited in claim 12, further comprising a pitchlock solenoid valve in communication with the pitchlock pressure, said pitchlock solenoid valve selectively operable to dump the pitchlock pressure such that the pitchlock pressure within said pitchlock piston pressure chamber falls below the coarse pitch pressure.

14. The pitchlock system as recited in claim 13, further comprises a pitchlock controller in communication with said pitchlock solenoid valve to selectively actuate said pitchlock solenoid valve.

15. The pitchlock system as recited in claim 13, wherein said pitchlock controller communicates with said pitchlock solenoid valve from a remote location.

16. The pitchlock system as recited in claim 12, wherein said ballscrew screw is pinned to a universal joint ring of said universal joint through a first sliding clearance fit, and said pitchlock screw is pinned to said universal joint ring through a second sliding clearance fit.

17. The pitchlock system as recited in claim 12, wherein torque is transmitted from the ballscrew screw to the pitchlock screw with minimal side loads.

* * * * *